US011213845B2

(12) United States Patent
Kusubashi et al.

(10) Patent No.: US 11,213,845 B2
(45) Date of Patent: Jan. 4, 2022

(54) CAN INNER SURFACE-COATING APPARATUS

(71) Applicants: TMC JAPAN CO., LTD, Tokyo (JP); G&P Inc., Tokyo (JP)

(72) Inventors: Ryosuke Kusubashi, Tokyo (JP); Naoyuki Yaguchi, Tokyo (JP)

(73) Assignees: TMC JAPAN CO., LTD., Tokyo (JP); G&P INC., Tokyo (JP)

( * ) Notice: Subject to any disclaimer, the term of this patent is extended or adjusted under 35 U.S.C. 154(b) by 22 days.

(21) Appl. No.: 16/643,921

(22) PCT Filed: Sep. 3, 2018

(86) PCT No.: PCT/JP2018/032681
§ 371 (c)(1),
(2) Date: Mar. 3, 2020

(87) PCT Pub. No.: WO2019/045111
PCT Pub. Date: Mar. 7, 2019

(65) Prior Publication Data
US 2020/0206767 A1  Jul. 2, 2020

(30) Foreign Application Priority Data

Sep. 4, 2017  (JP) .............................. JP2017-169786

(51) Int. Cl.
*B05B 13/06* (2006.01)
*B05B 16/00* (2018.01)
(Continued)

(52) U.S. Cl.
CPC ...... *B05B 13/0645* (2013.01); *B05B 13/0442* (2013.01); *B05B 16/90* (2018.02); *B05C 7/02* (2013.01); *B65D 25/14* (2013.01)

(58) Field of Classification Search
USPC .............. 118/319, 320, 500, 712, 306, 317; 427/230, 233
See application file for complete search history.

(56) References Cited

U.S. PATENT DOCUMENTS 2,919,801 A * 1/1960 Pechy ................ B21D 51/2692
209/587
3,977,358 A * 8/1976 Stroobants .......... B05B 13/0235
118/682

(Continued)

FOREIGN PATENT DOCUMENTS

| CN | 103240214 | 8/2013 |
| JP | 9-70559 | 3/1997 |

(Continued)

OTHER PUBLICATIONS

International Search Report for PCT/JP2018/032681 dated Oct. 16, 2018, 5 pages.

(Continued)

*Primary Examiner* — Yewebdar T Tadesse
(74) *Attorney, Agent, or Firm* — Nixon & Vanderhye P.C.

(57) ABSTRACT

Provided is a can inner surface-coating apparatus with which inspection of bottomed cylinders can be favorably performed in parallel without being affected by the coating process. In the can inner surface-coating apparatus, inspection cameras to be used for inspection following coating of the inner surface of a bottomed cylinder that will become the body of a can or bottle-shaped can are disposed above spray devices that are used for coating the inner surface of bottomed cylinders. Moreover, the coating area including the spray devices and the inspection area including the inspection cameras are covered with a cover. By supplying air inside the cover from the upper part (air supply port) of the inspection area and discharging the air out of the cover from the lower part (coating mist collection duct) of the (Continued)

coating area, an air flow is formed from the upper part of the inspection area to the lower part of the coating area.

6 Claims, 3 Drawing Sheets

(51) Int. Cl.
*B05B 13/04* (2006.01)
*B05C 7/02* (2006.01)
*B65D 25/14* (2006.01)

(56) References Cited

U.S. PATENT DOCUMENTS 5,206,054 A    4/1993   Schultz
5,474,609 A *  12/1995  Mulder ................... B05B 15/55
                                                    118/308

FOREIGN PATENT DOCUMENTS

| JP | 2001-328724 | 11/2001 |
| JP | 2003-1349   | 1/2003  |
| JP | 2003-205264 | 7/2003  |
| JP | 2006-43577  | 2/2006  |
| JP | 2007-70049  | 3/2007  |
| JP | 2008-183613 | 8/2008  |
| JP | 2013-99761  | 5/2013  |
| JP | 2014-240040 | 12/2014 |

OTHER PUBLICATIONS

Written Opinion of the ISA for PCT/JP2018/032681 dated Oct. 16, 2018, 4 pages.

* cited by examiner

CAN INNER SURFACE-COATING APPARATUS

This application is the U.S. national phase of International Application No. PCT/JP2018/032681 filed Sep. 3, 2018 which designated the U.S. and claims priority to JP Patent Application No. 2017-169786 filed Sep. 4, 2017, the entire contents of each of which are hereby incorporated by reference.

TECHNICAL FIELD

The present invention relates to a can inner surface-coating apparatus for coating the inner surface of a bottomed cylinder that becomes a body of a can or a bottle can.

BACKGROUND ART

Conventionally, there is known a can inner surface-coating apparatus for spraying paint onto the inner surface of a bottomed cylinder that becomes a body of a can or a bottle can, to form film of coating on the inner surface of the bottomed cylinder.

For example, the Patent Literature 1 discloses a can inner surface-coating apparatus comprises; a disk-shaped turret rotating intermittently by a predetermined angle each time; and a plurality of spray devices for spraying paint toward the inner surface of a bottomed cylinder. In this can inner surface-coating apparatus, the turret has a plurality of pockets that are arranged at regular intervals in the circumferential direction and hold bottomed cylinders while making the bottomed cylinders rotate around the respective axes of the bottomed cylinders. Owing to the intermittent rotation of the turret, the bottomed cylinders held in the respective pockets rotate intermittently around the axis of rotation of the turret by the predetermined angle each time while rotating respectively on their own axes. The plurality of spray devices are placed so as to correspond to respective positions at which the pockets stop for a predetermined time owing to the intermittent rotation of the turret. Each of the spray devices sprays paint onto an assigned area of the inner surface of a bottomed cylinder held by a pocket at the time when that pocket stops for the predetermined time at the position corresponding to the spray device concerned.

CITATION LIST

Patent Literature

Patent Literature 1: Japanese Unexamined Patent Application Laid-Open No. 2006-43577

SUMMARY OF INVENTION

Technical Problem

Usually, after the process of coating of the inner surface of a bottomed cylinder, inspection of the bottomed cylinder is performed with respect to the state of the coating and the external appearance of the bottomed cylinder. It is space-saving and advantageous from the viewpoint of cost if a can inner surface-coating apparatus used for inner surface-coating of a bottomed cylinder can also perform these inspections. However, in the case that the conventional can inner surface-coating apparatus is arranged so as to perform the inspection after coating of the inner surface of a bottomed cylinder, the following problem occurs.

That is to say, an inspection device for inspecting the state of coating of the inner surface, the external appearance, and the like of a bottomed cylinder is placed in the neighborhood of a spray device, and therefore suspending mist of paint sprayed from the spray device intrudes into an inspection area of the inspection device and may affect the inspection.

The present invention has been made taking the above situation into consideration, and an object of the invention is to provide a can inner surface-coating apparatus that can perform inspection of a bottomed cylinder successfully and parallelly without being affected by the coating process.

Solution to Problem

To solve the above problem, in the present invention, an inspection means used for inspection after coating of the inner surface of a bottomed cylinder that becomes a body of a can or a bottle can is placed above a spray means used for coating of the inner surface of the bottomed cylinder. By covering a coating area including the spray means and an inspection area including the inspect ion means, supplying air from an upper part of the inspection area into the inside of the cover, and discharging the air from a lower part of the coating area to the outside of the cover, air flow moving from the upper part of the inspection area toward the lower part of the coating area is formed in the inside of the cover. Here, it is possible to provide, in the inside of the cover, partition plates for separating the coating area and the inspection area while ensuring a moving path of the bottomed cylinder from the coating area to the inspection area.

For example, the present invention provides a can inner surface-coating apparatus for coating an inner surface of a bottomed cylinder that becomes a body of a can or a bottle can, comprising:

a coating turret, which rotates intermittently and has a plurality of coating pockets arranged at regular intervals in circumferential direction for holding the bottomed cylinder while rotating the bottomed cylinder around an axis of the bottomed cylinder;

a spray means, which is placed so as to correspond to a certain position at which the coating pockets stop owing to the intermittent rotation of the coating turret and sprays paint onto the inner surface of the bottomed cylinder held by the coating pocket stopping at that position;

an inspection turret, which rotates intermittently and has a plurality of inspection pockets arranged at regular intervals in circumferential direction for holding the bottomed cylinders;

an inspection means, which is placed above the spray means and inspects, at a certain position at which the inspection pocket stops owing to the intermittent rotation of the inspection turret, the bottomed cylinder held by the inspection pocket stopping at that position;

a relay means, which obtains the cylinder coated by the spray means from the coating pocket and makes the bottomed cylinder be held in the inspection pocket moving toward the inspection means owing to the intermittent rotation of the inspection turret;

a cover, which covers a coating area including the spray means and an inspection area including the inspection means; and an air supply/discharge means, which supplies air from an upper part of the inspection area into an inside of the cover and discharges the air from a lower part of the coating area to an outside of the cover, so as to form air flow moving from the upper part of the inspection area toward the lower part of the coating area, in the inside of the cover.

Advantageous Effects of Invention

In the present invention, the inspection means used for inspection of the bottomed cylinder after coating of the inner surface is placed above the spray means used for coating of the inner surface of the bottomed cylinder, and the coating area including the spray means and the inspection area including the inspection means are covered by the cover, and air is supplied from the upper part of the inspection area and discharged from the lower part of the coating area to the outside of the cover. Thereby, the airflow moving from the upper part of the inspection area toward the lower part of the coating area is formed in the inside of the cover. Accordingly, it is possible to prevent intrusion of suspending mist of the paint sprayed from the spray means into the inspection area. Thus, according to the present invention, it is possible to perform inspection of the cylinder successfully and parallelly without being affected by the coating process.

DESCRIPTION OF EMBODIMENTS

In the following, one embodiment of the present invention will be described referring to the drawings.

Figure 1:
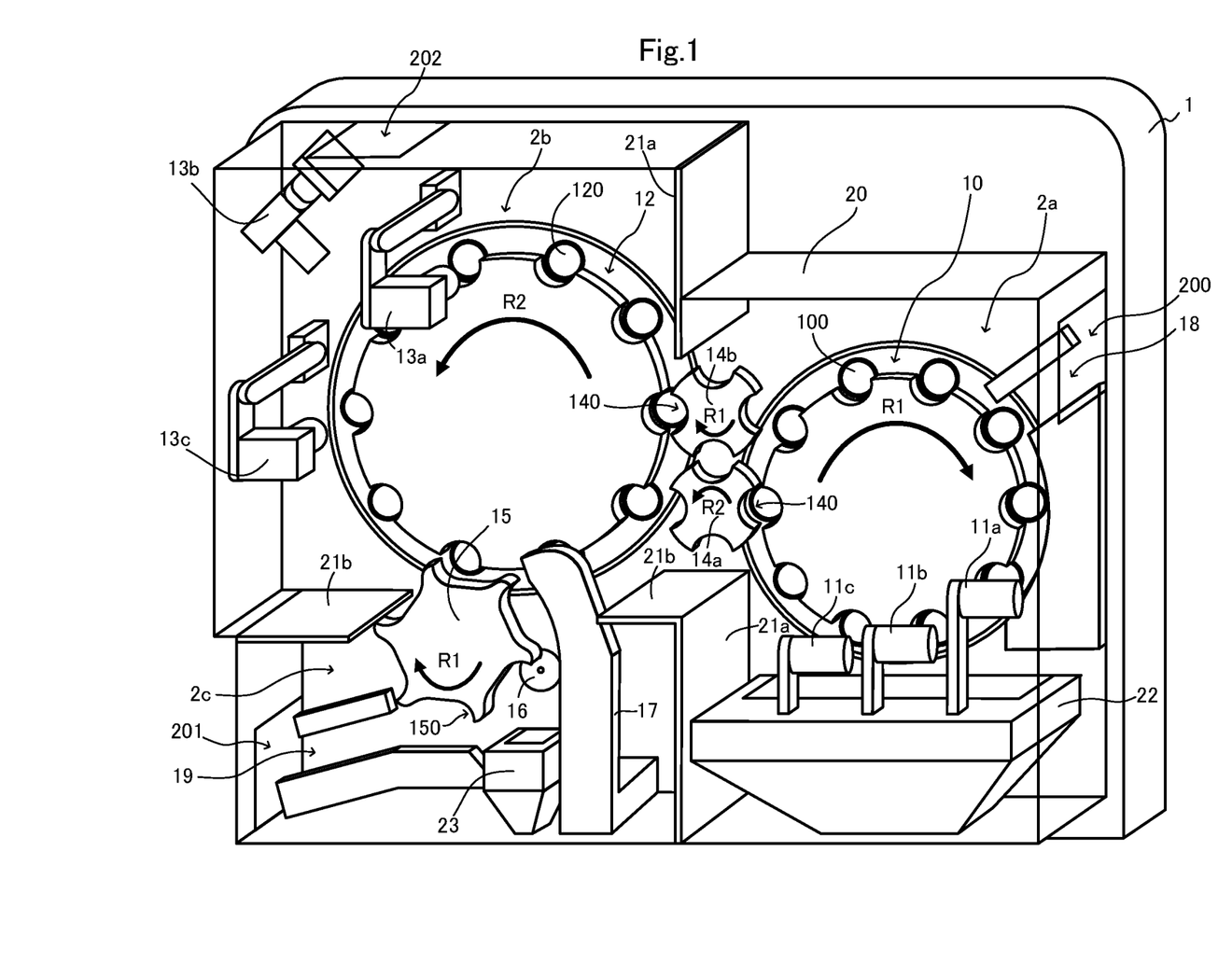
FIG. 1 is a perspective view showing a schematic configuration of a can inner surface-coating apparatus 1 of one embodiment according to the present invention.

FIG. 1 is a perspective view showing a schematic configuration of a can inner surface-coating apparatus 1 according to the present embodiment.

The can inner surface-coating apparatus 1 is an apparatus for spraying paint onto an inner surface of a bottomed cylinder 3 (See FIG. 2) that becomes a body of a can or a bottle can, so as to form film of coating of synthetic resin on the inner surface of the bottomed cylinder 3. As shown in the figure, the can inner surface-coating apparatus 1 comprises: a coating turret 10; spray devices 11a-11c; an inspection turret 12; inspection cameras 13a-13c; a pair of relay star wheels 14a and 14b; a bottom coating turret 15; a bottom spray device 16; a bottom coating guide 17; a feeding guide 18; a discharge guide 19; a cover 20; partition plates 21a and 21b; a coating mist collection duct 22; and a bottom coating mist collection duct 23.

The coating turret 10 is a disk rotating intermittently by a predetermined angle each time in the R1 direction, and has a plurality of coating pockets 100 arranged at regular intervals in the circumferential direction in the outer edge part of the coating turret 10. Each coating pocket 100 sucks the bottom of a bottomed cylinder 3, for example, by vacuuming and holds the bottomed cylinder 3 while rotating the bottomed cylinder 3 around the axis of the bottomed cylinder 3. In FIG. 1, only some coating pocket 100 is given the reference numeral.

The spray devices 11a-11c are placed so as to correspond respectively to certain positions at which the coating pockets 100 stop for a predetermined time owing to the intermittent rotation of the coating turret 10, and the spray devices 11a-11c spray paint onto the inner surfaces of the bottomed cylinders 3 held by the coating pockets 100 stopping at these positions. In FIG. 1, the spray devices 11a-11c are placed in the order of the spray devices 11a, 11b, and 11c from the upstream side to the downstream side of the transportation path, so that paint is sprayed onto the inner surface of a bottomed cylinder 3 by the spray devices 11a, 11b, and 11c in this order.

Here, the spray device 11a on the most upstream side sprays first paint onto the inner surface of the bottomed cylinder 3 from the bottom to the middle part of the inner surface of the bottomed cylinder 3, wherein the bottomed cylinder 3 is located at the opposed position to the spray device 11a owing to the intermittent rotation of the coating turret 10 and is rotating around its own axis. The spray device 11b sprays second paint onto the upper part (on the open side) of the inner surface of the bottomed cylinder 3 located at the opposed position to the spray device 11b owing to the intermittent rotation of the coating turret 10. And the spray device 11c on the most downstream side sprays the first paint onto the whole area of the inner surface of the bottomed cylinder 3 located at the opposed position to the spray device 11c owing to the intermittent rotation of the coating turret 10. Synthetic resin paint superior in wettability or coating properties and superior in corrosion resistant property is used as the first paint. For example, epoxy-acrylic resin, epoxy-urea resin, or epoxy-phenolic resin is used. Further, considering that the upper part of the bottomed cylinder 3 is subjected to processing (for example, necking into a bottle shape) as a post-process to the inner surface coating, synthetic resin paint superior in corrosion resistant property and more superior in processing resistant property than the first paint is used as the second paint. For example, is used: resin composition comprising epoxy-acrylic copolymer and phenol resin; resin composition containing polyvinyl chloride, phenol resin, and epoxy-acrylic copolymer; or resin composition containing epoxy-acrylic copolymer and aqueous solvent.

The inspection turret 12 is a disk rotating intermittently by a predetermined angle each time in the R2 direction (the reverse direction to the R1 direction), and has a plurality of inspection pockets 120 arranged at regular intervals in the circumferential direction in the outer edge part of the inspection turret 12. Each inspection pocket 120 sucks the bottom of a bottomed cylinder 3, for example, by vacuuming and holds the bottomed cylinder 3 while rotating the bottomed cylinder 3 around the axis of the bottomed cylinder 3. Further, the inspection turret 12 is placed above the coating turret 10. In FIG. 1, only some inspection pocket 120 is given the reference numeral.

The inspection cameras 13a-13c are placed above the spray devices 11a-11c, so as to correspond respectively to certain positions at which the inspection pockets 120 stop for a predetermined time owing to the intermittent rotation of the inspection turret 12, in order to take images of the bottomed cylinders 3 held by the inspection pockets 120 stopping at these positions. In FIG. 1, the inspection cameras 13a-13c are placed in the order of the inspection cameras 13a, 13b, and 13c from the upstream side to the downstream side of the transportation path, so that images of the bottomed cylinder 3 are taken in the order of the inspection cameras 13a, 13b, and 13c.

Here, the inspection camera 13a on the most upstream side takes an image of the inner surface of the bottomed cylinder 3 that is located at the opposed position to the inspection camera 13a by the intermittent rotation of the inspection turret 12 and is rotating itself. The inspection camera 13b takes an image of the outer surface of the bottomed cylinder 3 that is located at the opposed position to the inspection camera 13b by the intermittent rotation of the inspection turret 12 and is rotating around its own axis. And the inspection camera 13c on the most downstream side takes an image so that it is possible to see the whole shape of the bottomed cylinder 3 that is located at the opposed position to the inspection camera 13c by the intermittent rotation of the inspection turret 12 and is rotating around its own axis. The image data taken by the inspection cameras 13a-13c are subject to image processing and used respectively for inner surface inspection, outer surface inspection, and shape inspection of the bottomed cylinder 3.

The pair of relay star wheels 14a and 14b are disks positioned between the coating turret 10 and the inspection turret 12, and rotate synchronously with each other and intermittently by a predetermined angle each time in the directions reverse to each other. Each of the star wheels 14a and 14b has gripping parts 140 arranged at regular intervals in the circumferential direction in the outer periphery part, for gripping the body of the bottomed cylinders 3, for example, by vacuuming. In FIG. 1, only some gripping part 140 is given the reference numeral.

One relay star wheel 14a is positioned downstream of the transportation path relative to the spray devices 11a-11c, and rotates intermittently in synchronization with the intermittent rotation of the coating turret 10 in the reverse direction (the R2 direction) to the rotation direction (the R1 direction) of the coating turret 10. Accordingly, the gripping parts 140 of the relay star wheel 14a obtain the bottomed cylinders 3 sequentially from the coating pockets 100 of the coating turret 10, and deliver the bottomed cylinders 3 to the gripping parts 140 of the other relay star wheel 14b. The other relay star wheel 14b is positioned upstream of the transportation path relative to the inspection cameras 13a-13c, and rotates intermittently in synchronization with the intermittent rotations of the one relay star wheel 14a and the inspection turret 12 in the reverse direction (the R1 direction) to their rotation direction (the R2 direction). Accordingly, the gripping parts 140 of the other relay star wheel 14b obtains the bottomed cylinders 3 from the gripping parts 140 of the one relay star wheel 14a and delivers the bottomed cylinders 3 to the inspection pockets 120 of the inspection turret 12, sequentially.

The bottom coating turret 15 is a disk rotating intermittently by a predetermined angle each time in the R1 direction, and has bottom coating pockets 150 arranged at regular intervals in the circumferential direction in the outer edge part of the bottom coating turret 15. Each bottom coating pocket 150 grips the body of a bottomed cylinder 3, for example, by vacuuming. Further, the bottom coating turret 15 is placed below the inspection turret 12. The bottom coating pockets 150 obtain the bottomed cylinder 3 from the inspection pockets 120 of the inspection turret 12, downstream from the inspection cameras 13a-13c. In FIG. 1, only some bottom coating pocket 150 is given the reference number.

The bottom spray device 16 is placed below the inspection cameras 13a-13c, so as to correspond to a certain position at which the bottom coating pockets 150 stop for a predetermined time owing to the intermittent rotation of the bottom coating turret 15, and sprays paint onto the outer surface of the bottom of the bottomed cylinder 3 gripped by the bottom coating pocket 150 stopping at this position.

The bottom coating guide 17 guides the bottomed cylinders 3 gripped by the bottom coating pockets 150 of the bottom coating turret 15.

The feeding guide 18 guides the bottomed cylinders 3 fed into the coating pockets 100 of the coating turret 10, on the upstream side of the transportation path relative to the spray devices 11a-11c.

The discharge guide 19 guides the bottomed cylinders 3 discharged from the coating pockets 150 of the bottom coating turret 15, on the downstream side of the transportation path relative to the bottom spray device 16.

The cover 20 is formed of transparent member such as acrylic, and covers a coating area 2a including the coating turret 10 and the spray devices 11a-11c, an inspection area 2b including the inspection turret 12 and the inspection cameras 13a-13c, and a bottom coating area 2c including the bottom coating turret 15 and the bottom spray device 16.

The cover 20 has a feed port 200, which is provided in the upper part of the side surface on the side of the coating area 21 for feeding the bottomed cylinders 3 to the feeding guide 18, and a discharge port 201, which is provided in the lower part of the side surface on the side of the bottom coating area 2c for discharging the bottomed cylinders 3 from the discharge guide 19, in the transportation path. Further, the cover 20 has an air supply port 202, which is provided in the upper surface of the cover 20 on the side of the inspection area 2b for supplying air into the inside of the cover 20, a discharge port (not shown), which is provided in the lower surface on the side of the coating area 2a and to which the coating mist collection duct 22 is attached, and a discharge port (not shown), which is provided in the lower surface on the side of the bottom coating area 2c and to which the bottom coating mist collection duct 23 is attached. An air supply fan for forcedly sending air into the inside of the cover 20 may be attached to the air supply port 202.

The partition plates 21a separate the coating area 2a and the inspection area 2b, both covered by the cover 20, and maintain the inspection area 2b in positive pressure relative to the coating area 2a whose air is forcedly discharged by the below-described discharge fan, while ensuring a moving path of the bottomed cylinders 3 from the coating area 2a to the inspection area 2b. The partition plates 21b separate the inspection area 2b and the bottom coating area 2c, both covered by the cover 20, and maintain the inspection area 2b in positive pressure relative to the bottom coating area 2c whose air is forcedly discharged by the below-described discharge fan, while ensuring a moving path of the bottomed cylinders 3 from the inspection area 2b to the bottom coating area 2c.

The coating mist collection duct 22 is positioned under the spray devices 11a-11c in the coating area 2a, and discharges mist of paint sprayed from the spray devices 11a-11c together with the air in the cover 20. A discharge fan (not shown) for forcedly discharge the air in the cover 20 is attached to the coating mist collection duct 22.

The bottom coating mist collection duct 23 is positioned under the bottom spray device 16 in the bottom coating area 2c, and discharges mist of paint sprayed from the bottom spray device 16 together with the air in the cover 20 to the outside. A discharge fan (not shown) for forcedly discharge the air in the cover 20 is attached to the bottom coating mist collection duct 23.

Next, operation of the above-described can inner surface-coating apparatus 1 will be described.

Figure 2:
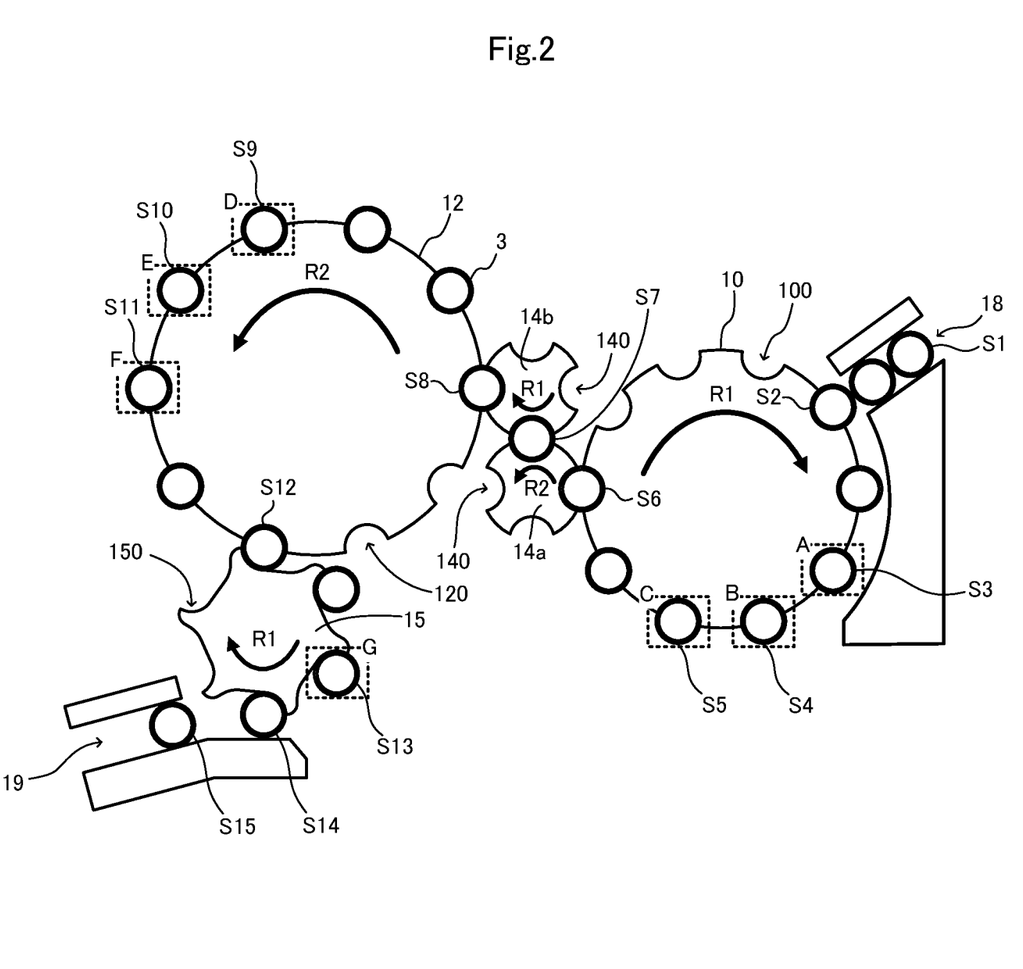
FIG. 2 is a view for explaining a transportation path of a bottomed cylinder 3 in the can inner surface-coating apparatus 1.

FIG. 2 is a view for explaining the transportation path of the bottomed cylinders 3 in the can inner surface-coating apparatus 1.

First, when a bottomed cylinder 3 is fed to the feeding guide 18 (S1), the bottomed cylinder 3 is guided to a coating pocket 100 of the coating turret 10 (S2). As a result, the bottomed cylinder 3 is held in the coating pocket 100 and rotated intermittently in the direction R1 around the axis of rotation of the coating turret 10 while rotating on its own axis.

Next, when the bottomed cylinder 3 moves to and once stops at the position A of the spray device 11a on the most upstream side owing to the intermittent rotation of the coating turret 10 (S3), the spray device 11a on the most upstream side sprays the first paint onto the inner surface of the bottomed cylinder 3 from the bottom to the middle part. Then, when the bottomed cylinder 3 moves to and once stops at the position B of the spray device 11b (S4), the spray device 11b sprays the second paint onto the upper part (on the open side) of the inner surface of the bottomed cylinder 3. Thereafter, when the bottomed cylinder 3 moves to and once stops at the position C of the spray device 11c on the most downstream side (S5), the spray device 11c on the most downstream side sprays the first paint onto the whole area of the inner surface of the bottomed cylinder 3. As a result, film of coating of synthetic resin is formed on the inner surface of the bottomed cylinder 3.

Next, when the bottomed cylinder 3 moves to and once stops at the position of delivery to the relay star wheel 14a owing to the intermittent rotation of the coating turret 10 (S6), the bottomed cylinder 3 is gripped by a gripping part 140 of the relay star wheel 14a. As a result, the bottomed cylinder 3, whose inner surface has been coated by the spray devices 11a-11c, is delivered from the coating turret 10 to the relay star wheel 14a, and is transported in the direction R2 around the axis of rotation of the relay star wheel 14a.

Then, the bottomed cylinder 3 moves to and once stops at the position of delivery to the relay star wheel 14b owing to the intermittent rotation of the relay star wheel 14a (S7), the bottomed cylinder 3 is gripped by a gripping part 140 of the relay star wheel 14b. As a result, the bottomed cylinder 3 is delivered from the relay star wheel 14a to the relay star wheel 14b and is transported in the direction R1 around the axis of rotation of the relay star wheel 14b.

Next, when the bottomed cylinder 3 moves to and once stops at the position of delivery to the inspection turret 12 owing to the intermittent rotation of the relay star wheel 14b (S8), the bottomed cylinder 3 is held in an inspection pocket 120 of the inspection turret 12 and is transported in the direction r2 around the axis of rotation of the inspection turret 12. As a result, the bottomed cylinder 3 is delivered from the relay star wheel 14b to the inspection turret 12 and is transported in the direction R2 around the axis of rotation of the inspection turret 12 while rotating on its own axis.

Next, when the bottomed cylinder 3 moves to and once stops at the position D of the inspection camera 13a on the most upstream side owing to the intermittent rotation of the inspection turret 12 (S9), the inspection camera 13a takes an image of the inner surface of the bottomed cylinder 3. Then, when the bottomed cylinder 3 moves to and stops at the position E of the inspection camera 13b (S10), the inspection camera 13b takes an image of the outer surface of the bottomed cylinder 3. Thereafter, when the bottomed cylinder 3 moves to and stops at the position F of the inspection camera 13c on the most downstream side (S11), the inspection camera 13c takes an image of the whole shape of the bottomed cylinder 3. These image data are used for performing inner surface inspection, outer surface inspection, and shape inspection of the bottomed cylinder 3.

Next, when the bottomed cylinder 3 moves to and once stops at the position of delivery to the bottom coating turret 15 owing to the intermittent rotation of the inspection turret 12 (S12), the bottomed cylinder 3 is gripped by a bottom coating pocket 150 of the bottom coating turret 15. As a result, the bottomed cylinder 3 is delivered from the inspection turret 12 to the bottom coating turret 15 and transported in the direction R1 around the axis of rotation of the bottom coating turret 15.

Next, when the bottomed cylinder 3 moves to and stops at the position G of the bottom spray device 16 (S13), the bottom spray device 16 sprays paint onto the outer surface of the bottom of the bottomed cylinder 3.

Then, the bottomed cylinder 3 moves to the position of delivery to the discharge guide 19 owing to intermittent rotation of the bottom coating turret 15 (S14), to be delivered to the discharge guide 19. As a result, the bottomed cylinder 3 is discharged, being guided by the discharge guide 19 (S15).

Figure 3:
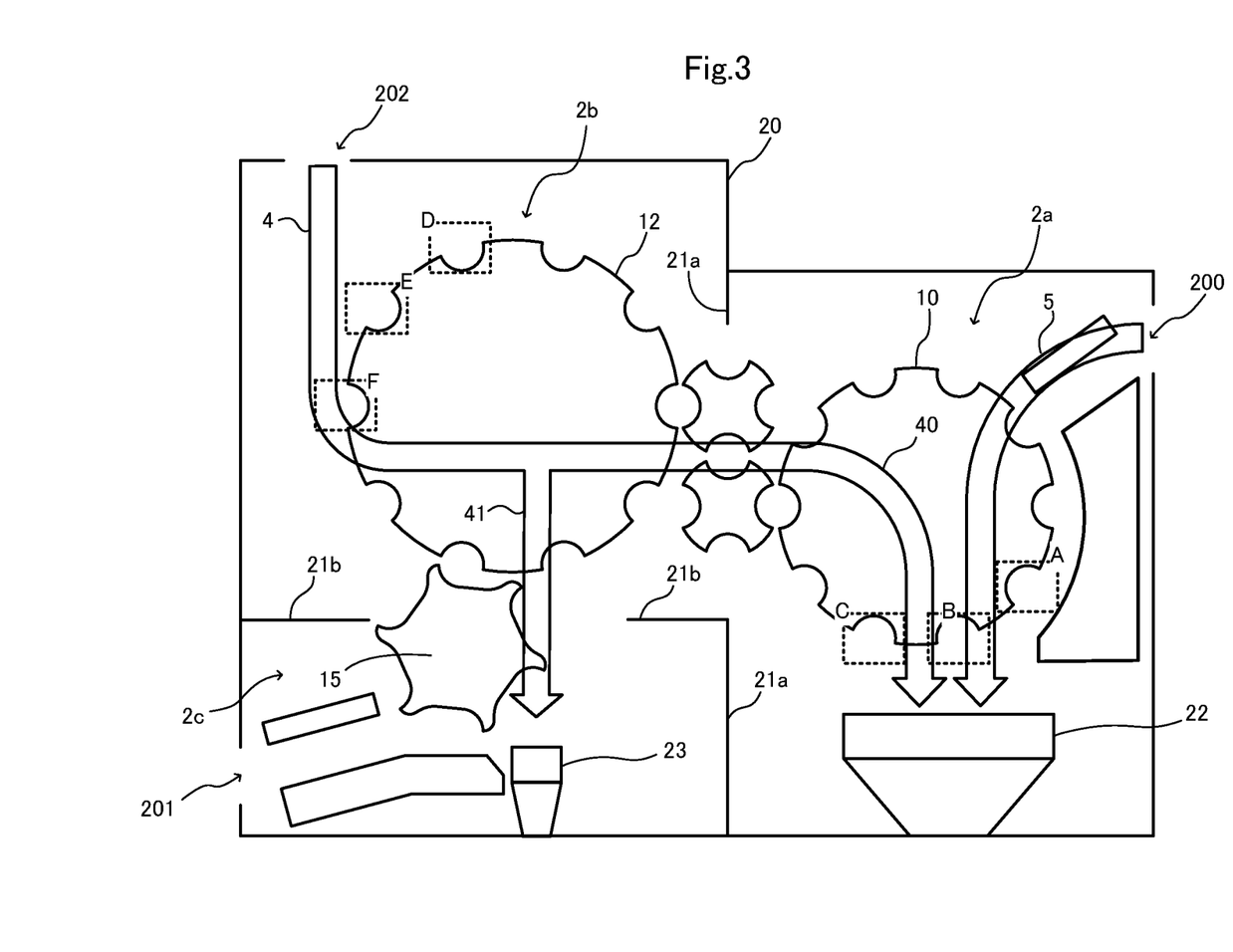
FIG. 3 is a view for explaining airflow in the can inner surface-coating apparatus 1.

FIG. 3 is a view for explaining airflow in the can inner surface-coating apparatus 1.

Air 4 flows into the inspection area 2b through the air supply port 202 provided in the upper part of the inspection area 2b. A part 40 of the air 4 passes between the partition plates 21a and flows into the coating area 2a, and is discharged to the outside through the coating mist collection duct 22 provided in the lower part of the coating area 2a by the discharge fan attached to the coating mist collection duct 22. The other part 41 of the air 4 passes between the partition plates 21b and flows into the bottom coating area 2c, and is discharged to the outside through the bottom coating mist collection duct 23 provided in the lower part of the bottom coating area 2c by the discharge fan attached to the bottom coating mist collection duct 23. Further, air 5 flows into the coating area 2a through the feed port 200 provided in the upper part of the side surface of the coating area 2a. Most of this air 5 is discharged to the outside through the coating mist collection duct 22 provided in the lower part of the coating area 2a by the discharge fan attached to the coating mist collection duct 22. Accordingly, in the inside of the cover 20, air flows are formed so as to flow from the upper part of the inspection area 2b toward the respective lower parts of the coating area 2a and the bottom coating area 2c.

Hereinabove, one embodiment of the present invention has been described.

In the present embodiment, the inspection cameras 13a-13c used for inspection of the bottomed cylinders 3 after coating of their inner surfaces are positioned above the spray devices 11a-11c used for coating of the inner surfaces of the bottomed cylinders 3 and the bottom spray device 16 used for coating of the bottoms of the bottomed cylinders 3. And, the cover 20 envelopes the coating area 2a including the spray devices 11a-11c, the inspection area 2b including the inspection cameras 13a-13c, and the bottom coating area 2c including the bottom spray device 16, and air is supplied from the upper part of the inspection area 2b into the inside of the cover 20, and discharged from the respective lower parts of the coating area 2a and the bottom coating area 2c to the outside of the cover 20. As a result, airflows are formed so as to flow from the upper part of the inspection area 2b toward the respective lower parts of the coating area 2a and the bottom coating area 2c. Accordingly, it is possible to prevent intrusion of suspending mist of the paint sprayed from the spray devices 11a-11c and the bottom spray device 16 into the inspection area 2b. Thus, according to the present embodiment, it is possible to perform inspection of the bottomed cylinders 3 without being affected by the coating operation.

Further, the present embodiment provides the partition plates 21a that separate the coating area 2a and the inspection area 2b, both covered by the cover 20, while ensuring the moving path of the bottomed cylinders 3 from the coating area 2a to the inspection area 2b. Thereby, the inspection area 2b is maintained in positive pressure relative to the coating area 2a whose air is forcedly discharged, and accordingly it is possible to prevent more effectively that suspending mist of the paint sprayed from the spray devices 11a-11c intrudes from the coating area 2a into the inspection area 2b, and it is possible to maintain the inspection area 2b clean.

Similarly, the present embodiment provides the partition plates 21b that separate the inspection area 2b and the bottom coating area 2c, both covered by the cover 20, while ensuring the moving path of the bottomed cylinders 3 from the inspection area 2b to the bottom coating area 2c. Thereby, the inspection area 2b is maintained in positive pressure also relative to the bottom coating area 2c whose air is forcedly discharged, and accordingly it is possible to prevent more effectively that suspending mist of the paint sprayed from the bottom spray device 16 intrudes from the bottom coating area 2c into the inspection area 2b, and it is possible to maintain the inspection area 2b clean.

The present invention is not limited to the above embodiment, and can be variously changed within the scope of the invention.

For example, in the above embodiment, in the case where the air supply fan for forcedly sending air into the inside of the cover 20 is attached to the air supply port 202 provided in the upper surface of the cover 20, the discharge fan(s) attached to the coating mist collection duct 22 and/or the bottom coating mist collection duct 23 may be omitted.

Further, the above embodiment has been described taking an example in which, as inspection devices for inspecting the bottomed cylinders 3, the inspection cameras 13a-13c for taking images of the bottomed cylinders 3 are positioned in the inspection area 2b. The present invention is not limited to this. It is possible to use an inspection device that can inspect the state of coating, external appearance, or the like of the inner surface of the bottomed cylinders 3. For example, instead of the inspection cameras or together with the inspection cameras, a color discrimination photoelectric sensor, which discriminates a color of film of coating by a detected wavelength detected by a light receiving element with respect to reflected light of light emitted from a light emitting element, an eddy-current displacement sensor, which discriminates the state of film of coating by displacement amount detected by a detection coil that generates a high-frequency magnetic field, or an ultrasonic displacement gauge, a laser displacement gauge, or the like may be used. Further, in the case where it is possible to inspect the state of coating of the whole area of the inner surface, the whole external appearance, and the like of the bottomed cylinders 3, it is not needed that each inspection pocket 120 of the inspection turret 12 is given a function of rotating each bottomed cylinder 3 around the axis of the bottomed cylinder 3 itself.

Further, in the above embodiment, each bottomed cylinder 3 is inspected before coating the bottom of the bottomed cylinder 3. The present invention, however, is not limited to this. The inspection of the bottomed cylinder 3 may be performed in the last place. Further, it is not needed to perform the bottom coating of the bottomed cylinders 3 in the can inner surface-coating apparatus 1. In this case, it is possible to omit the bottom coating turret 15, the bottom spray device 16, and the bottom coating guide 17 from the can inner surface-coating apparatus 1.

Further, it is possible to provide a braking mechanism for stopping the rotation of the bottomed cylinder 3 itself in the coating pocket 100 at a position between the spray device 11c on the most downstream side and the one relay star wheel 14a. By this, the bottomed cylinder 3 is slowed down sufficiently before transferring to the relay star wheel 14a, and thereby it is possible to transfer the bottomed cylinder 3 surely from the coating pocket 100 to the relay star wheel 14a.

Further, in the above embodiment, the spray devices 11a-11c are placed sequentially from the upstream side to the downstream side of the transportation path, so that the first paint is sprayed onto the inner surface of the bottomed cylinder 3 from the bottom to the middle part, and next the second paint is sprayed onto the upper part (on the open side) of the inner surface of the bottomed cylinder 3, and then the first paint is sprayed onto the whole area of the inner surface of the bottomed cylinder 3. However, the areas and order of paint spraying are not limited to this. For example, it is possible that the second paint is sprayed onto the upper part of the inner surface of the bottomed cylinder 3, and next the first paint is sprayed onto the middle part of the inner surface of the bottomed cylinder 3, and then the first paint is sprayed onto the bottom of the inner surface of the bottomed cylinder 3.

Further, in the above embodiment, paint coating onto the inner surface of the bottomed cylinder 3 is performed in three separate steps. The present invention, however, is not limited to this. Paint coating onto the bottomed cylinder 3 may be performed in one step, or in a plurality of separate steps other than three steps.

Further, in the above embodiment, the inspection turret 12 is placed above the coating turret 10. The present invention is not limited to this. The inspection turret 12 may be placed at the same level as the coating turret 10.

REFERENCE SIGNS LIST

1: can inner surface-coating apparatus; 3: bottomed cylinder; 10: coating turret; 11a-11c: spray device; 12: inspection turret; 13a-13c: inspection camera; 14a, 14b: relay star wheel; 15: bottom coating turret; 16: bottom spray device; 17: bottom coating guide; 18: feeding guide; 19: discharge guide; 20: cover; 21a, 21b: partition plate; 22: coating mist collection duct; 23: bottom coating mist collection duct; 100: coating pocket; 120: inspection pocket; 140: gripping part; 150: bottom coating pocket; 200: feed port; 201: discharge port; and 202: air supply port.

The invention claimed is:

1. A can inner surface-coating apparatus for coating an inner surface of a bottomed cylinder that becomes a body of a can or a bottle can, comprising:
   a coating turret, which rotates intermittently and has a plurality of coating pockets arranged at regular intervals in circumferential direction for holding the bottomed cylinder while rotating the bottomed cylinder around an axis of the bottomed cylinder;
   a spray means, which is placed so as to correspond to a certain position at which one of the plurality of coating pockets stops owing to the intermittent rotation of the coating turret and sprays paint onto the inner surface of the bottomed cylinder held by said one of the plurality of coating pockets stopping at that position;
   an inspection turret, which rotates intermittently and has a plurality of inspection pockets arranged at regular intervals in circumferential direction for holding the bottomed cylinder;
   an inspection means, which is placed above the spray means and inspects, at a certain position at which one of the plurality of inspection pockets stops owing to the intermittent rotation of the inspection turret, the bottomed cylinder held by said one of the plurality of inspection pockets stopping at that position;

a relay means, which obtains the bottomed cylinder coated by the spray means from the said one of the plurality of coating pockets and makes the bottomed cylinder be held in said one of the plurality of inspection pockets moving toward the inspection means owing to the intermittent rotation of the inspection turret;

a cover, which covers a coating area including the spray means and an inspection area including the inspection means; and an air supply/discharge means, which supplies air from an upper part of the inspection area into an inside of the cover and discharges the air from a lower part of the coating area to an outside of the cover, so as to form air flow moving from the upper part of the inspection area toward the lower part of the coating area, in the inside of the cover.

2. A can inner surface-coating apparatus of claim 1, further comprising:

a first partition plate, which separates the coating area and the inspection area, both covered by the cover, while ensuring a moving path of the bottomed cylinder from the coating area to the inspection area.

3. A can inner surface-coating apparatus of claim 2, wherein:

the can inner surface-coating apparatus further comprises:

a bottom coating turret, which rotates intermittently and has a bottom coating pocket for holding the bottomed cylinder and is placed below the inspection turret; and a bottom spray means, which is placed below the inspection means below the inspection means, so as to correspond to a certain position at which the bottom coating pocket stops owing to the intermittent rotation of the bottom coating turret, and sprays paint onto an outer surface of a bottom of the bottomed cylinder held by the bottom coating pocket stopping at that position;

the bottom coating pocket obtains the bottomed cylinder inspected by the inspection means from said one of the plurality of inspection pockets;

the cover covers a bottom coating area including the bottom spray means, in addition to the coating area including the spray means and the inspection area including the inspection means; and the air supply/discharge means supplies air from the upper part of the inspection area into the inside of the cover and discharges the air from the lower part of the coating area and a lower part of the bottom coating area to the outside of the cover, so as to form air flows moving from the upper part of the inspection area toward the respective lower parts of the coating area and the bottom coating area, in the inside of the cover.

4. A can inner surface-coating apparatus of claim 3, further comprising:

a second partition plate, which separates the inspection area and the bottom coating area, both covered by the cover, while ensuring a moving path of the bottomed cylinder from the inspection area to the bottom coating area.

5. A can inner surface-coating apparatus of claim 1, wherein:

the can inner surface-coating apparatus further comprises:

a bottom coating turret, which rotates intermittently and has a bottom coating pocket for holding the bottomed cylinder and is placed below the inspection turret; and a bottom spray means, which is placed below the inspection means below the inspection means, so as to correspond to a certain position at which the bottom coating pocket stops owing to the intermittent rotation of the bottom coating turret, and sprays paint onto an outer surface of a bottom of the bottomed cylinder held by the bottom coating pocket stopping at that position;

the bottom coating pocket obtains the bottomed cylinder inspected by the inspection means from said one of the plurality of inspection pockets;

the cover covers a bottom coating area including the bottom spray means, in addition to the coating area including the spray means and the inspection area including the inspection means; and the air supply/discharge means supplies air from the upper part of the inspection area into the inside of the cover and discharges the air from the lower part of the coating area and a lower part of the bottom coating area to the outside of the cover, so as to form air flows moving from the upper part of the inspection area toward the respective lower parts of the coating area and the bottom coating area, in the inside of the cover.

6. A can inner surface-coating apparatus of claim 5, further comprising:

a second partition plate, which separates the inspection area and the bottom coating area, both covered by the cover, while ensuring a moving path of the bottomed cylinder from the inspection area to the bottom coating area.

\* \* \* \* \*